United States Patent [19]

Reicherts et al.

[11] 4,289,554
[45] Sep. 15, 1981

[54] METHOD FOR MAKING A MOBILE HOME CEILING CONSTRUCTION

[75] Inventors: James E. Reicherts, Oakwood Hills; William C. Veschuroff, Palatine, both of Ill.

[73] Assignee: United States Gypsum Company, Chicago, Ill.

[21] Appl. No.: 148,891

[22] Filed: May 12, 1980

Related U.S. Application Data

[62] Division of Ser. No. 8,919, Feb. 5, 1979.

[51] Int. Cl.³ ............................ B32B 31/16; B27F 7/00; B32B 7/08; E04B 5/57
[52] U.S. Cl. ................................ 156/92; 52/309.5; 52/309.8; 52/309.13; 52/363; 52/483; 52/511; 52/745; 144/318; 156/290; 156/291; 428/195; 428/223; 428/535
[58] Field of Search .............. 52/309.5, 309.8, 309.13, 52/363, 483, 511, 512; 144/318; 156/92, 290, 291; 428/195, 223, 535

[56] References Cited

U.S. PATENT DOCUMENTS

| | | | |
|---|---|---|---|
| 1,297,523 | 3/1919 | With | 52/285 X |
| 1,448,886 | 3/1923 | Walper | 52/417 X |
| 1,638,280 | 8/1927 | Utzman | 428/192 X |
| 1,790,348 | 1/1931 | Jewell | 52/363 X |
| 1,978,632 | 10/1934 | Hoff et al. | 428/223 |
| 2,249,590 | 7/1941 | Allen | 428/223 X |
| 2,369,595 | 2/1945 | Miles et al. | 52/483 |
| 2,760,450 | 8/1956 | Findleton | 144/318 X |
| 2,861,525 | 11/1958 | Curtis et al. | 428/179 X |
| 2,975,092 | 3/1961 | Hagerty | 156/92 X |
| 3,020,602 | 2/1962 | Siering | 52/363 X |
| 3,057,384 | 10/1962 | Patterson et al. | 144/318 |
| 3,085,301 | 4/1963 | Nuorivaara | 52/471 X |
| 3,472,118 | 10/1969 | Jureit | 52/483 |
| 3,545,154 | 12/1970 | Bobzin et al. | 52/471 X |
| 3,722,171 | 3/1973 | Godley | 52/745 |
| 3,726,056 | 4/1973 | Harris et al. | 52/316 X |
| 3,802,142 | 4/1974 | Fehr | 52/483 X |
| 3,826,055 | 7/1974 | Bobzin et al. | 52/483 |
| 4,007,571 | 2/1977 | Marchello et al. | 52/483 |
| 4,033,083 | 7/1977 | Fritz et al. | 52/484 |

FOREIGN PATENT DOCUMENTS

738863 10/1955 United Kingdom ................ 52/483
1379932 1/1975 United Kingdom ................ 52/483

Primary Examiner—Caleb Weston
Assistant Examiner—Robert A. Dawson
Attorney, Agent, or Firm—Samuel Kurlandsky; Robert H. Robinson; Glenn W. Ohlson

[57] ABSTRACT

A method for making a unitized, ready-to-install, mobile home ceiling structure is disclosed. The method comprises the steps of arranging a plurality of rectangular panels on a tunnel jig. A roof frame structure is then positioned and fastened on the back face surfaces of the panels by means of fasteners and adhesive along the bottom chords of intermediate roof frame truss members. The method additionally includes the step of fastening roof frame perimeter side edge rails and outer truss members to the panel arrangement perimeter by means of fasteners driven upwardly through the front face surface of the panels to extend through the panels and penetrate the side edges rails and outer truss members. The method includes the step of transporting the mobile home ceiling structure from the tunnel jig in ready-to-install condition wherein the setup time of the adhesive material does not restrict moving the unit.

28 Claims, 10 Drawing Figures

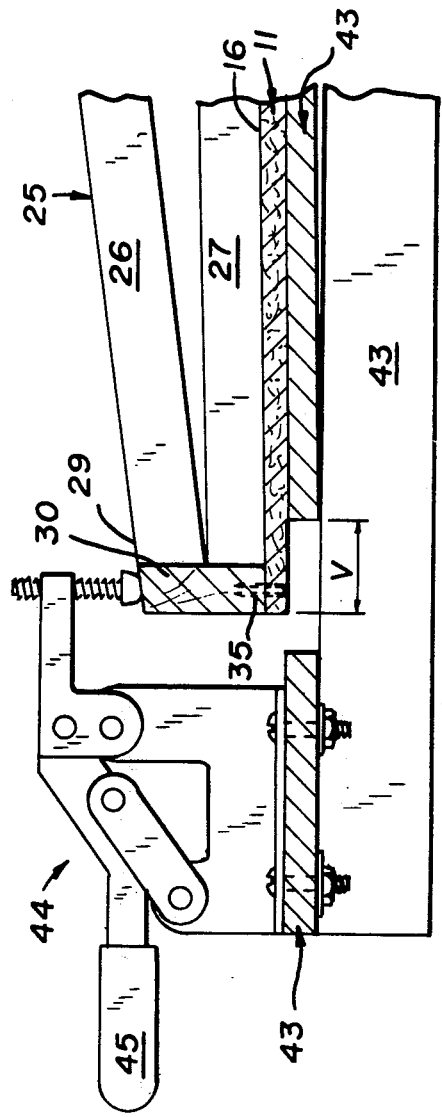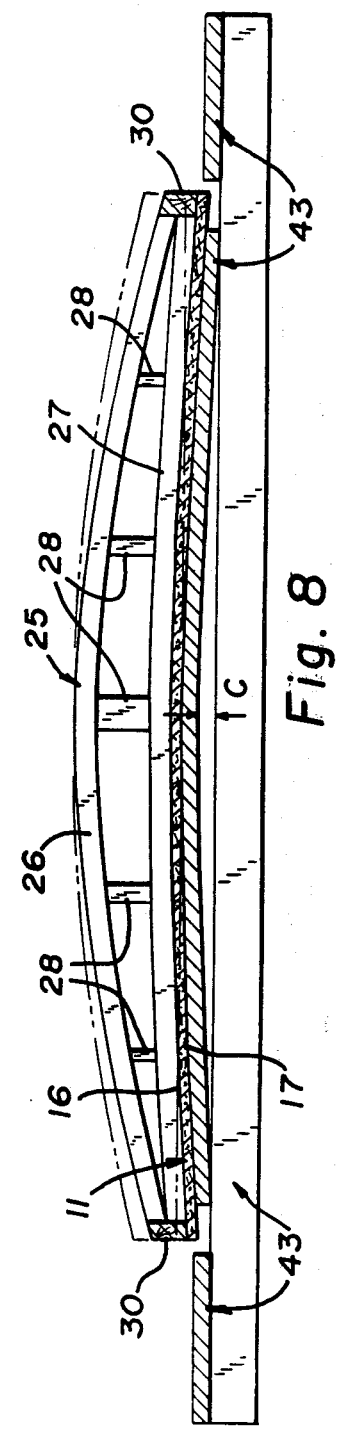

METHOD FOR MAKING A MOBILE HOME CEILING CONSTRUCTION

This is a division of application Ser. No. 008,919, filed Feb. 5, 1979.

THE BACKGROUND OF THE INVENTION (1) Field of the Invention

The invention relates to mobile home ceiling construction providing a concealed, back fastened, ready-to-install ceiling unit and method for manufacturing said ceiling unit.

(2) Description of the Prior Art

The increased desirability for mobile home living in recent years has been in part created by the ability of mobile home manufacturers to provide interior accommodations comparable to conventional building construction. One particular aspect of mobile home construction which has provided problems involves the ceiling system. With the increased lengths and widths of room sizes it has become an industry wide concern to provide a ceiling which is aesthetically pleasing as well as structurally sound.

Concealment of the required attachment elements for supporting ceiling panels has been a continuing concern and has been somewhat attained through numerous prior attempts. However, the solutions involved disguising nails, staples, screws, wires and the like, by covering them with splines, battens, rosettes, and other similar exposed cosmetic devices.

Additionally, when the industry has attempted to entirely eliminate any exposed artifices it has provided back face fastening means which unfortunately created additional problems. The most common problem with the back fastening techniques disclosed in the prior art involves the necessity of providing non-conventional specialized ceiling panels. Conventional panels are usually comprised of gypsum, wood fiber, mineral fiber, pressed paper, and other widely known construction materials. These are typically manufactured in predetermined lengths and widths employing simple rectangular shapes. It has become problematic to adapt concealed back fastening techniques to conventional panels. It would be highly desirable to avoid costly additional manufacturing steps required to prepare special panels to receive particular concealed fastening devices.

Less complex back fastening systems have been provided and utilize adhesive materials connecting the back faces of the panels to roof frame truss members. Problems with these adhesives involve the delay of drying or set-up time and thus slowing down the manufacture. Additionally, when subjected to extreme heat, such as experienced in a fire, the bonding between the back faces of the panels and truss members is lost and the ceiling system quickly fails.

One prior art solution to back fastening is disclosed in U.S. Pat. No. 4,033,083, wherein conventional four foot wide sheets of ceiling board are back fastened. The practice of this invention however requires that the ceiling boards have cuts in the back faces to receive particularly shaped angled flanges of fastening devices. The conventional ceiling board must be subjected to additional manufacturing steps for use therein. Another attempt at eliminating face exposed fasteners is disclosed in U.S. Pat. No. 3,826,055. This patent requires a flexible sheet to be adhered to the back face of panels and crimped at truss locations to provide flaps whereby fasteners penetrate the flaps for engagement to truss members. The sheet material must necessarily be flexible in order to be folded to provide the flaps at truss spacing intervals. The teaching of this prior art system eliminates exposed fasteners and can provide a vapor barrier. However, the fastening of the panels is dependent upon the strength and heat resistance of the flexible material since it is the connective means between the panel and truss. Failure therein would necessarily cause the system to fail by the panels disengagement from the framing.

Other older prior art systems having mechanical fastenings concealed from view utilize metal pronged devices. One such system is disclosed in U.S. Pat. No. 1,297,523. This patent discloses a plate having upper and lower prongs. The upper prongs are inserted initially into truss members and then ceiling panels are forced upwardly against the lower prongs and hammered into place. This system provides concealed fastening but prevents placement of a vapor barrier material above and additionally precludes fabricating a unitized ceiling structure.

Another older system effecting concealed fastening is disclosed in U.S. Pat. No. 1,790,348. In this disclosure a similar technique is utilized wherein a slotted staple is first affixed to truss members and depending prongs are then forced into engagement with upper ceiling panel surfaces. In this disclosure, as well as in the aforementioned U.S. Pat. No. 1,297,523, deformation of the front face of the panels can occur during the driving of the panels upwardly into engagement with the prongs. Additionally, flush joints between panels may become difficult to obtain and the rudimentary construction techniques prohibit attaining close tolerances.

It is thus evident from the prior art attempts to solve all the needs of the mobile home construction industry that a unitized ceiling structure having concealed back fastening with vapor barrier adaptability is not found. Prior art attempts at providing concealed back fastening introduce additional manufacturing problems regarding the alteration of conventional ceiling panels. It would be desirable to utilize conventional panels in a unitized ceiling structure having flush joints and concealed back fastenings capable of providing a vapor barrier and capable of prefabricated modular use involving no additional drying or set time for adhesives.

SUMMARY OF THE INVENTION

Accordingly, it is an object of the present invention to provide a mobile home ceiling unit offering ready-to-install construction adapted to supportively coact with mobile home support wall means and provide a concealed, back fastened, aesthetically pleasing, uninterrupted ceiling surface.

It is another object of this invention to provide a method of manufacturing a mobile home ceiling unit providing steps whereby the ceiling structure is ready-to-install following the fastening of roof frame truss members to an arrangement of panels.

It is still another object of the present invention to provide concealed back fastening characterized by the utilization of mechanical fasteners being driven to penetrate both bottom chords of truss members and back face surfaces of panels, and additionally characterized by incorporating adhesive material disposed along the bottom chords, for securement between panels and truss members.

It is yet another object of the invention to provide a vapor barrier at the back face surface of the panels.

It is a concomitant object of the invention to provide a method of manufacturing a mobile home ceiling unit which requires no time delay for drying or setting-up of adhesives.

In one aspect thereof, the present invention is characterized by the provision wherein adhesive material is disposed between bottom chords of truss members and the back face surface of the ceiling panels, and a group of back fasteners is spaced apart at intervals along sides of the bottom chords of the truss penetrating both bottom chords and back face surface of the panels for affixation between panels and roof frame.

In another aspect thereof, the present invention is characterized by the provision wherein adhesive material is disposed along sides of the bottom chords at the back face surfaces of the panels over previously driven back fasteners which are spaced apart at intervals along the sides of the bottom chords of the truss members and said fasteners penetrating both the bottom chords and the back face surface of the panels for affixation between panels and roof frame.

The foregoing and other objects, advantages and characterizing features of this invention will become clearly apparent from the folowing description of certain illustrative embodiments thereof, considered along with the accompanying drawings, where like reference numerals signify like elements throughout various figures.

BRIEF DESCRIPTION OF THE DRAWINGS

FIG. 7 is a cross-section view illustrating a step in accordance with the method of manufacture of the mobile home ceiling unit shown in FIG. 6 taken along lines 7—7 looking in the direction of the arrows.

FIG. 8 illustrates another stage in the method of manufacture of the mobile home ceiling unit shown in FIG. 6 taken along lines 8—8 looking in the direction of the arrows.

DESCRIPTION OF THE PREFERRED EMBODIMENTS

Figure 1:
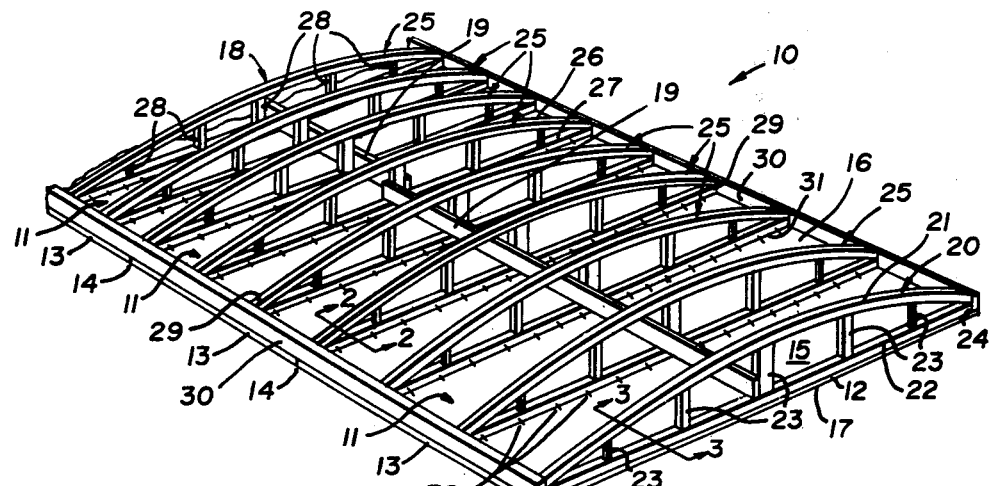
FIG. 1 is a perspective view looking down at a portion of the mobile home ceiling unit in accordance with this invention.

In the preferred embodiment, as best seen in FIG. 1, a portion of mobile home ceiling unit 10 is shown in perspective view looking downward from above the unit. Ceiling unit 10 comprises panels 11 fastened to roof frame 18. In keeping with the invention, ceiling unit 10 is characterized by its ready-to-install form whereby a mobile home manufacturer may simply transport ceiling unit 10 for lay-in positioning on wall support means.

In carrying out the invention, panels 11 are preferably provided having conventional widths of about four feet and lengths of about twelve feet. The lengths of the panel can, depending upon specific construction requirements, typically vary from about ten feet to about sixteen feet. Conventional materials may be used to make the panels for the invention but preferably panels 11 comprise gypsum board. However, other suitable materials may be used such as plywood, wood fiber, pressed paper board, mineral fiber and the like. Panels 11 have long sides 12 and short sides 13. Panels 11 are arranged in adjacent edge-to-edge relationship having long sides 12 abutting at joints 14. This arrangement provides overall rectangular panel arrangement 15. Panel arrangement 15 has back face surface 16 and exposed front face surface 17 viewable from a room below when ceiling unit 10 is installed.

Present day mobile home construction techniques limit maximum room lengths to about thirty-two feet. Therefore, to provide a ceiling for this room size, in accordance with this invention, eight panels 11, having widths of four feet, would be utilized to accommodate such dimensions. However, ceiling unit 10 may have a greater length than thirty-two thereby bridging more than one room by incorporating more than eight panels 11. Of course, smaller room sizes may be manufactured as well. Panels 11 are preferably four feet in width. This conventional dimension for mobile home ceiling construction is regarded as providing a size having wide acceptance and utility. Panels 11 are preferably provided with a thickness of about 5/16 inch. If made from the preferred gypsum material, panels 11 may be prepared from a light weight mixture whereby the 5/16 inch thickness in combination with a light weight gypsum material provides an easily installed and structurally sound ceiling surface.

Further, in accordance with the invention, roof frame 18 is fastened atop the back face surface 16 of the panel arrangement 15. Roof frame 18 comprises a multiplicity of truss members, with outer truss members 20 residing at opposite ends of roof frame 18. Only one outer truss member 20 is shown in FIG. 1 since the view illustrates in perspective a partial portion of the ceiling unit 10. Between outer truss members 20 reside intermediate truss members 25 which are spaced apart at intervals therebetween. Interconnecting outer truss members 20 and intermediate truss members 25 are center rails 10. These are preferably provided in a one inch by four inch dimenon and provide structural integrity between the roof frame truss members.

Outer truss members 20 are provided in a bow string construction preferably with a span of about twelve feet, less the two widths of side edge rails 30, for spanning panel arrangement 15. Outer truss member 20 has a bowed top chord 21 connected to bottom chord 22. Struts 23 interconnect top chord 21 with bottom chord 22 intermediate terminal end portions 24. Top chord 21 connects directly with bottom chord 22 at said terminal end portions 24. Top chord 21, as illustrated, has cross-sectional dimensions of 1⅛ inch by 1½ inch and bottom chord 22 has cross-sectional dimensions of 1⅜ inch by 1½ inch. The outer truss members 20 are desirably constructed of wood wherein struts 23 may be provided as wood or metal interconnective elements.

Also in accordance with the invention, intermediate truss members 25 are provided with a conventional bow string construction and have a span of about twelve feet, less the two widths of side edge rails 30, across the panel arrangement 15. Intermediate truss members 25 comprise a top chord 26 similarly having cross-sectional dimensions of 1⅛ inch by 1½ inch and a bottom chord 27 having cross-sectional dimensions of 1⅜ inch by 1½ inch. Interconnecting top chord 26 to bottom chord 27 are struts 28 located intermediate terminal end portions 29. Struts 28 may be provided in wood or metal but in the embodiment shown in FIG. 1 comprise wood. Similarly, intermediate truss member 25 is comprised of wood top chords 26 and bottom chords 27. Top chord 26 and bottom chord 27 meet and are directly connected at terminal end portions 29 of intermediate truss member 25.

Side edge rails 30 run transverse to the spans of the truss members and interconnect intermediate truss members 25 and outer truss members 20 by affixation to terminal end portions 24 and terminal end portions 29. Conventional nail fasteners or the like are utilized to affix side edge rails 30 to said terminal end portions of the truss members. In this manner, the roof frame 18 is itself an integral frame unit capable of being individually lifted prior to fastening panel arrangement 15 thereto.

In providing panels 11 for panel arrangement 15 in four foot widths, joints 14 occur at regular intervals. Conventional truss member spacing provides members at sixteen inch center-to-center intervals. Therefore in the preferred embodiment, accommodating conventional construction spacing techniques, intermediate truss members 25 are spaced apart from each other at sixteen inch center-to-center intervals and similarly outer truss members 20 are spaced apart from the juxtaposed intermediate truss member 25 by a sixteen inch center-to-center spacing. In this manner, a truss member is provided at each joint 14 between adjacent panels 11. This spacing provides support and strength to the ceiling unit 10. Other spacing intervals for the truss members are within the scope of this invention. Acceptable spacing intervals may range from about sixteen inches center-to-center to about twenty-four inches center-to-center.

Figure 3:
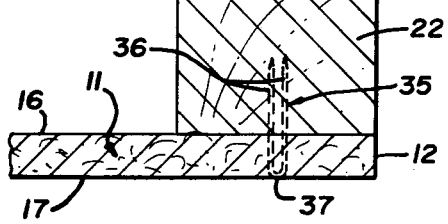
FIG. 3 is a cross-sectional view of one embodiment of the front face fastening in accordance with the invention taken along line 3—3 of FIG. 1 looking in the direction of the arrows.
Figure 2:
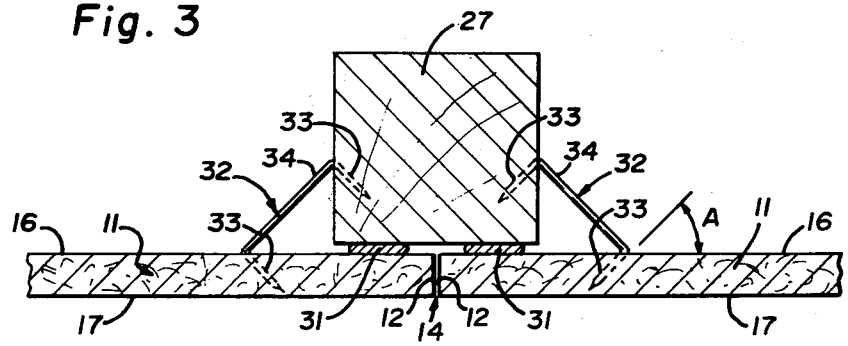
FIG. 2 is a cross-sectional view of one embodiment of the back fastening in accordance with this invention taken along line 2—2 of FIG. 1 looking in the direction of the arrows.

In order to more fully describe ceiling unit 10 reference is now made with respect to FIGS. 2 and 3 providing greater detail for the illustration of FIG. 1. FIG. 2 shows bottom chord 27 of an intermediate truss member 25 at a joint 14. The view is cross-sectional taken along lines 2—2 of FIG. 1 looking in the direction of the arrows. Adjacent panels 11 are abutted along their longest sides 12 forming joint 14. Bottom chord 27 is affixed to the back face surface 16 by means of an adhesive material 31 and back fasteners. The back fasteners in the preferred embodiment are staples 32.

Continuing with reference to FIG. 2, staples 32 are desirably provided at two sides of the bottom chords 27 across the back face surface 16 of panels 11, but can be provided at closer spacing along only one side. In the preferred embodiment staples 32 are provided at only the intermediate truss members 25. They may also be provided at the outer truss members 20 for additional strength. They are preferably spaced at intervals of six inches. However, in keeping with the invention, the staple spacing may range up to about twelve inches center-to-center. When providing staples 32 along only one side a spacing no greater than about eight inches is preferred. Staples 32 are driven at an angle A to the back face surface 16. The preferable angle A is 45° but, in accordance with this invention, may be from about 30° to about 60°. Staples 32 comprise legs 33 interconnected by a crown 34. In the preferred embodiment, utilizing panels 11 having a thickness of 5/16 of an inch, legs 33 preferably have a length of one-half inch and crown 34 has a width of one inch. Legs 33 penetrate both the bottom chord 27 and panels 11. The length of legs 33 is necessarily provided in such a dimension such that they do not pierce the front face surface 17.

Also providing fastening means between panel arrangement 15 and bottom chords 27 is adhesive material 31. In the preferred embodiment adhesive material 31 is provided at each intermediate truss member 25 in beads across the back face surface 16 of panel arrangement 15. Although preferably two beads of adhesive material 31 are provided at each bottom chord 27, it is within the scope of this invention to utilize only one bead or a multiplicity. It is desirable that at least one bead be applied at each bottom chord 27 of intermediate truss members 25. In the preferred embodiment, bottom chords 22 of outer truss members 20 do not have adhesive material 31 applied thereto, but it is within the purview of this invention to provide additional securement by applying adhesive material 31 to outer truss members 20.

Adhesive material 31 preferably has properties that allow it to be non-embrittling or non-crystallizing when set. It must additionally be gap filling within minimum or reduced creep tendencies. It is desirably elastomeric having a set-up time of from about one hour to about twenty-four hours. Such materials utilized for the adhesive can be high performance synthetic rubber based adhesives such as: styrene-butadiene; other block polymer styrene butadienes; and, neoprene rubber. Also, water based latex adhesives may be used which provide these properties. In the preferred embodiment, adhesive material 31 comprises a synthetic rubber tackified with synthetic resins, reinforced with inert fillers and dispersed in organic solvents. This material has the properties of bridging gaps between the bottom chords 27 and back face surfaces 16 and also holding a bead without flowing when applied. It sets up within 24 hours expediting fabrication in mobile home construction. Latex adhesives which can set-up within one to about twenty-four hours are usable if such other properties can also be obtained.

Looking now at FIG. 3, the front face fastening in accordance with this invention is illustrated in cross-sectional view taken along lines 3—3 of FIG. 1 looking in the direction of the arrows. In this illustration, bottom chord 22 of outer truss member 2C is shown fastened to the panels 11 by means of a front face fastener. The front face fastener in the preferred embodiment comprises staple 37 penetrating front face surface 17, extending through panel 11 and penetrating bottom chord 22. Staple 35 has a U-shape similar to staple 32 and preferably comprises legs 36 having a length of about 1¼ inch and a crown 37 having a width of about one inch. Staples 35 not only are provided as front face fasteners at outer truss members 20 but additionally are driven upwardly along the side edge rails 30 as best seen in FIG. 7. Staples 35 are desirably driven around the perimeter of the front face surface 17 extending upwardly through panels 11 to penetrate side edge rails 30 and bottom chords 22 of outer truss members 20. The spacing around this perimeter for the stapling is preferably at four to about six inches center-to-center. It is desirable that a range of no greater than about six inches center-to-center be provided in accordance with this invention. However, the spacing of the front face fasteners may be varied within the scope of this invention.

With staples 35 driven upwardly around the perimeter of the panel arrangement 15 at front face surface 17, installation of ceiling unit 10 conceals these front face fasteners from view as they are positioned, during installation in a mobile home, to reside at the top plate portion of a wall support means and thereby are not exposed to view from the room below.

Prior art attempts to effectuate concealed back fastening by use of stapling techniques have failed due to problems encountered with improperly driven staples. Most often the problem involved the difficulty of driving staples at an angle to pierce both a truss member and panel without a leg of the staple deflecting off the panel and diving beneath the truss member or only partially penetrating the panel. In trying to effectuate stapling, other attendant difficulties were created by efforts to provide sheet metal and other specially formed shapes for fasteners which would not substantially increase material costs and would not require time consuming special techniques or apparatus. It has become a goal of mobile home manufacturers to develop back fastening ceiling systems which do not rely primarily on adhesive attachment but do not at the same time involve such preclusive costs and time delays. The present use of adhesive attachment presents problems during a fire and intense heat due to the degradation of adhesive material and resultant dropping of panels. A mechanical attachment would retain panels in place longer allowing additional time for escape from the room as well as prevention of flame spread. The present invention combines a unique back fastening stapling and adhesive attachment. Sufficient strength is provided by the stapling which avoids assembly line delay for adhesive set-up time and will maintain the panels in place after degradation of the adhesive material caused by a fire. Moreover, after setting up, the adhesive, in combination with the back fastened staples, provides a ceiling unit which meets present day wind loading requirements for mobile homes.

Stable 32 comprises a wire staple construction and has preferable dimensions in conformance with the invention but a tolerance of dimensions in within the utile scope of this invention. The range of length for legs 33 is from about ¼ inch to about ¾ inch. The range of width for crown 34 is from about ¾ inch to about 1½ inch. It is preferable that the front face fastening utilize staples but it is within the scope of the invention that other adaptable mechanical fastenings may be used. Staples 35 are preferable in that a common pneumatic staple gun application for back and front face fastening would expedite manufacturing operations. Some other usable fasteners will become apparent to one skilled in the art such as nails, screws, differently shaped staples, and the like.

Figure 9:
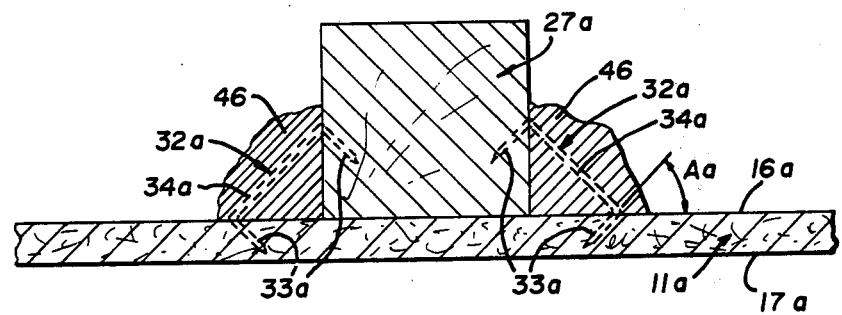
FIG. 9 illustrates a preferred alternative embodiment for the back fastening steps in a method of manufacture of a mobile home ceiling unit in accordance with this invention.

An alternate preferred embodiment for back fastening is illustrated in FIG. 9. Therein, the back fastening comprises staples 32a, again preferably spaced apart at intervals of about six inches to about twelve inches center-to-center, and having legs 33a in a length of ½ inch and crown 34a in a width of one inch. The alternate construction in this illustration utilizes foamed adhesive materal 46 preferably disposed along two sides of bottom chord 27a substantially covering staples 32a. The foamed adhesive 46 contacts bottom chord 27a and back face surface 16a of panels 11a. Again with this alternate preferred embodiment, staples 32a comprise legs 33a which are driven at an angle of about 30° to about 60° with respect to the back face surface 16a. Legs 33a stop short of penetrating front face surface 17a thereby providing a concealed back fastened construction. FIG. 9 discloses a bottom chord 27a not located at a panel joint but rather at a mid panel location. This embodiment at a joint 14a (not shown) would comprise the same construction with foamed adhesive 46 and staples 32a in substantially identical relationship as shown. In this embodiment a polyurethane foam comprises foamed adhesive 46. However, equally usable foamed adhesives may be found such as epoxy foam, polystyrene foam, and other foamed adhesives having similar properties.

With the embodiment disclosed in FIG. 9, it is desirable that foamed adhesive 46 be placed on both sides of bottom chords 27a of intermediate truss members 25a (not fully shown) but may optionally be applied on only one side of non-joint, mid-panel, bottom chords 27a. Foamed adhesive 46 may be additionally provided at outer truss members 20a (not shown) for additional securement.

In both of the embodiments shown in FIGS. 2 and 9 the adhesive and back fasteners accomplish the required fastening whereby, in conjunction with the front fastening described, ceiling unit 10, or 10a (not fully shown), may be transported as a unit for installation on wall support means in a mobile home. Roof frame 18 of securely fastened to panel arrangement 15 to provide this ready-to-install highly desirable construction. The construction of this desirable ceiling unit 10 is accomplished by the method steps disclosed in FIGS. 4–8 and the following description.

Figure 4:
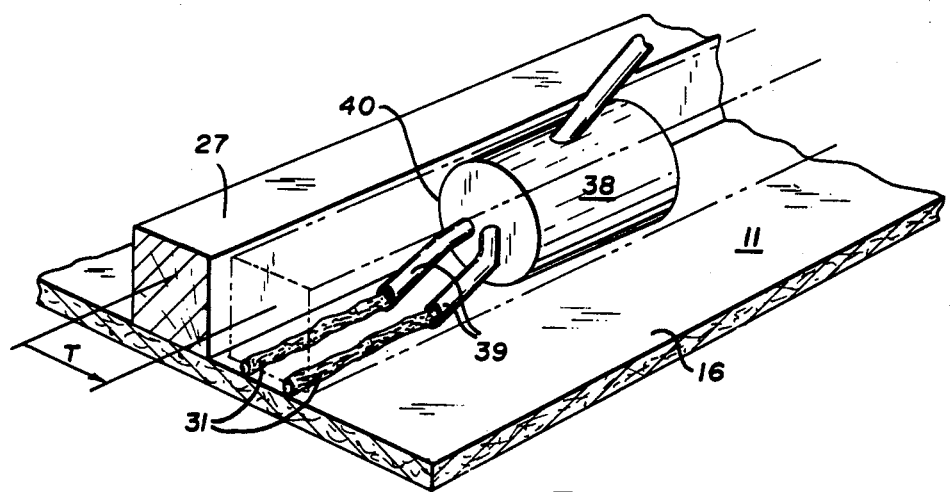
FIG. 4 is a perspective view looking down at a preferred embodiment for the application of adhesive material in a method of manufacture of the mobile home ceiling unit shown in FIG. 1

The preferable method for construction of ceiling unit 10 first requires placement of panels 11 on tunnel jig 43. The panels are arranged in edge-to-edge relationship abutting longer sides 12 at joints 14. The tunnel jig 43 utilized for arranging the panels is of a design widely known to the mobile home construction industry. Tunnel jig 43 has a gap below each joint 14 avoiding the problem of adhesive slipping through the joints and adhering to the tunnel jig surface. In the preferred embodiment shown in FIG. 4, roof frame 18 is placed atop back face surface 16 at an offset distance T of from about one inch to about three inches wherein the outer truss members 20 and intermediate truss members 25 are offset this distance from their final position. The application of adhesive material 31 follows. A pneumatic adhesive applicator 38 may be used wherein a guide means 40 is provided as part of the pneumatic adhesive applicator 38 permitting bottom chord 27, as shown in FIG. 4, to be used as a guide means allowing placement of straight beads of adhesive. The adhesive applicator 38 preferably has dual nozzles 39 emitting adhesive material 31 at an adjustable pumped rate. It is preferable that the adhesive be laid down in dimensions of from about ¼ inch to about ⅜ inch diameter. Alternatively, the application of adhesive material 31 can be accomplished prior to placement of the roof frame on the back face surface 16 by simply applying adhesive material 31 at intervals in correspondence with the spacing of the roof frame 18 truss members. Or, as an equally desirable alternate, adhesive material 31 may be placed along the bottom surface of bottom chords 27 prior to placement of roof from 18 thereby allowing roof frame 18 to be placed in final position on back face surface 16 without offsetting it.

In the preferred embodiment shown in FIG. 4, the roof frame 18 is then translated the offset distance T into final position (shown by phantom lines) placing bottom chord 27 on adhesive material 31. In the alternative preferred embodiment, shown in FIGS. 9 and 10, utilizing foamed adhesive 46 rather than adhesive material 31, the roof frame 18 is initially placed atop panel arrangement 15, prior to adhesive application, with truss members at their final spaced interval position.

Figure 6:
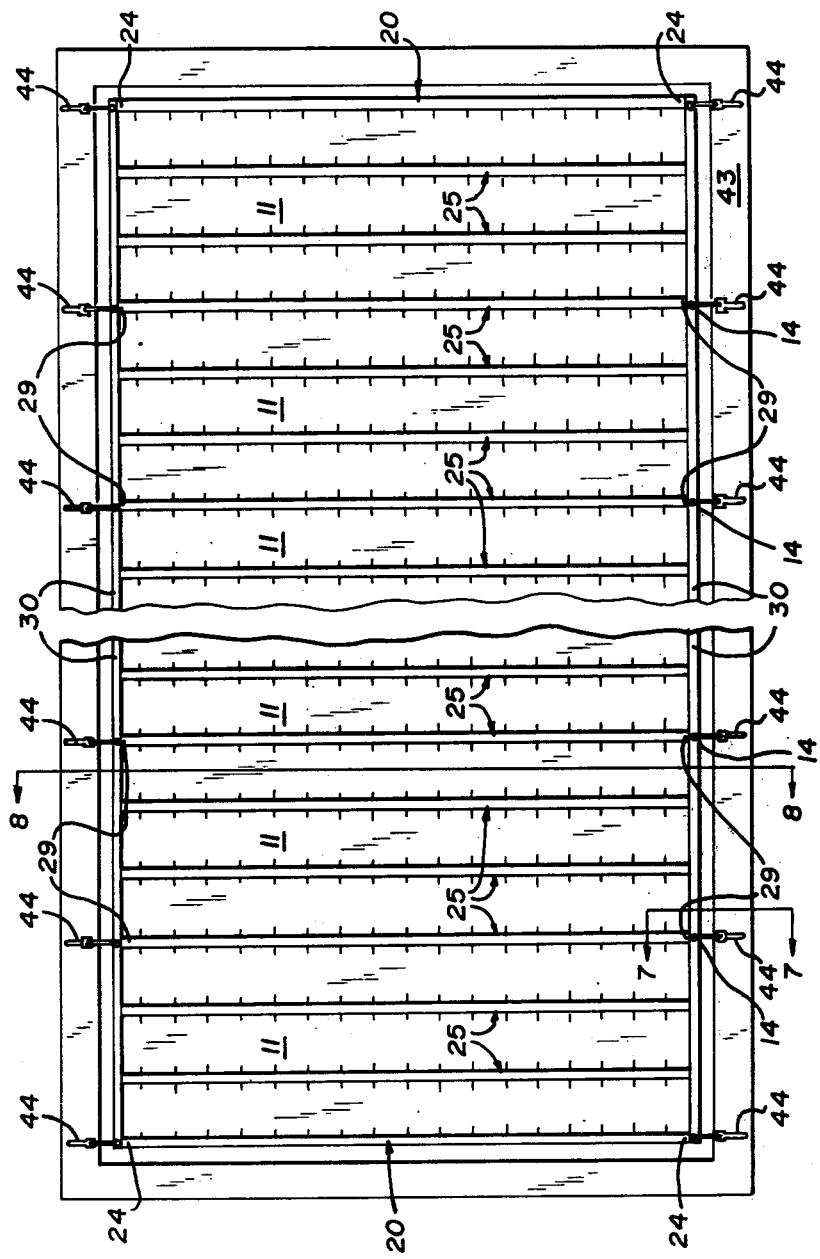
FIG. 6 is a plan view of the back face surface of a preferred embodiment of a mobile home ceiling unit in accordance with this invention.

With particular reference now to FIGS. 6–8, it is desirable to ensure intimate contact between bottom chords 27 and back face surface 16 with adhesive material 31 therebetween. This is preferably accomplished by cambering tunnel jig 43 along its longitudinal axis thereby arching the panel arrangement 15 lying across the tunnel jig 43 support surface. As best seen in FIG. 8, camber C is provided at the longitudinal axis of tunnel jig 43. Camber C is preferably about ⅜ of an inch when a twelve foot ceiling span is manufactured. However, camber C distance can range from about two inches down to flat. In providing camber C the panel arrangement 15 thereby becomes bowed upwardly. To provide close contact between the bottom chords 27 and back face surface 16 clamping means 44 are provided. They are located, as best seen in FIG. 6, at the opposite terminal end portions 29 of the intermediate truss members 25 located at joints 14 and at terminal end portions 24 of outer truss members 20. As shown in FIG. 7, clamping means 44 comprises a tightening arm 45. When arm 45 is tightened the truss members 20 and 25 are forced downward placing bottom chords 22 and 27 into intimate contact with back face surface 16 across the cambered tunnel jig 43. Thus, gaps and voids are eliminated and adhesive material 31 is compressed between these contacting surfaces. In the preferred alternate embodiment shown in FIGS. 9 and 10, wherein a foamed adhesive 46 is utilized, cambering is not required and a tunnel jig similar to tunnel jig 43 would remain flat for the full manufacturing method disclosed for this alternative method in accordance with the invention.

Figure 5:
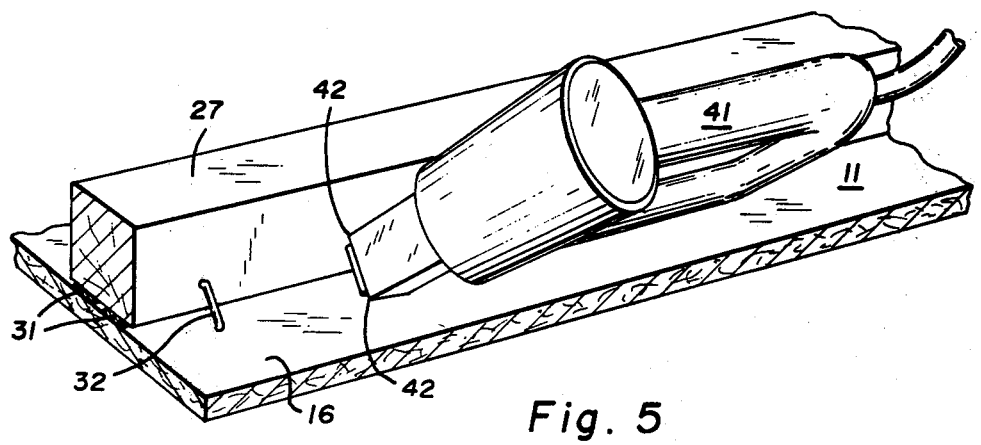
FIG. 5 is a perspective view looking down at a preferred embodiment for the step of driving back fasteners for the preferred method of manufacture of the embodiment shown in FIG. 1.

Turning now to FIG. 5, a step subsequent to the tightening of clamping means 44 is disclosed. This step comprises driving staples 32 for back fastening roof frame 18. A pneumatic staple gun 41 is shown having bevelled head surfaces 42 allowing the angular dimension A to be attained by utilizing the bottom chord 27 and back face surface 16 as guiding means to maintain a constant angle for driving staples 32. Staples 32 are desirably driven on both sides of the bottom chords 27 at intervals of up to about twelve inches but may be driven on one side only at a spacing of not more than about eight inches. The application of staples 32 is provided at the intermediate truss members 25 and may additionally be provided on the inner side of the outer truss members 20 if additional securement is desirable. Front face fastening involving the step of driving staples 35 may be accomplished prior to the back fastening of staples 32 because the operations are independent and therefore after the clamping step either the back face fastening or the front face fastening may be undertaken. Moreover, if using two pneumatic staplers, both staples 32 and 35 may be driven during the same time.

With specific reference to FIG. 7, it is seen that a staple 35 is shown in final driven position. An overlap V of about one to about three inches is provided between the edge of ceiling unit 10 and portion of tunnel jig 43 allowing panels 11 to overlap the tunnel jig 43 and expose the perimeter of the front face surface 17 of panel arrangement 15. This is preferable to facilitate the driving of staples 35 around the perimeter. A pneumatic device such as pneumatic staple gun 41 is desirably utilized for this procedure. The staples 35 are driven directly upward through panels 11 extending therethrough to penetrate side edge rail 30 as shown in FIG. 7. Not shown in FIG. 7, but illustrated with reference to FIG. 3, bottom chords 22 of outer truss members 20 also receive the front face fastening wherein the pneumatic stapling device drives staples 35 upwardly through panel 11 penetrating bottom chords 22 of outer truss members 20. It is desirable that the staples 35 be driven with crowns 37 generally parallel to the adjacent perimeter edge of panel arrangement 15.

Figure 10:
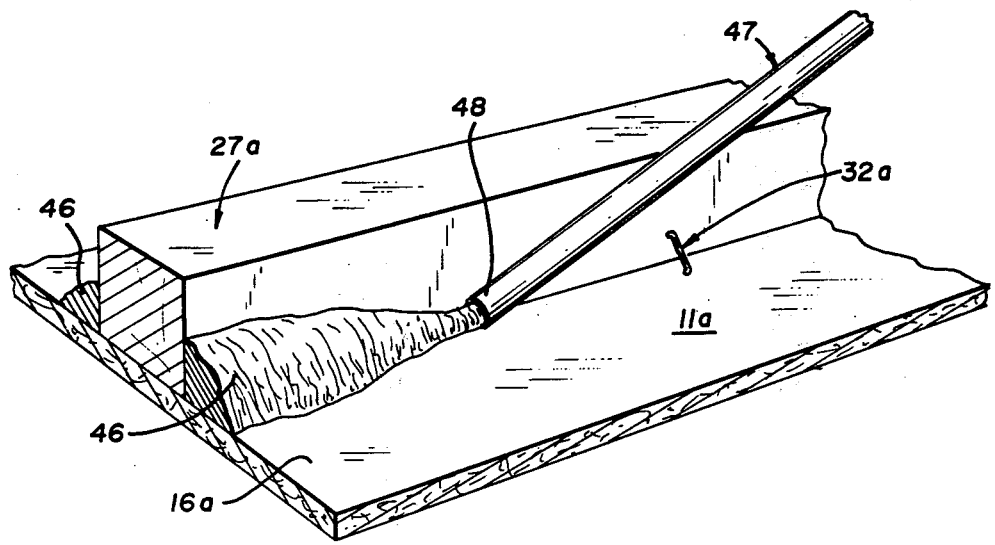
FIG. 10 illustrates the step of disposing foamed adhesive material for the back fastening steps in the embodiment as disclosed in FIG. 9.

For the alternative preferred embodiment depicted in FIGS. 9 and 10, utilizing foamed adhesive 46 along both sides of intermediate truss members 25 a (not fully shown), the front face fastening step proceeds substantially identical to the front face fastening just described with regard to the preferred embodiment utilizing adhesive material 31. However, the back face fastening first requires driving staples 32a prior to the application of adhesive material 46. After the roof frame 18a is positioned with truss members at their final position a device such as pneumatic staple gun 41 having a bevelled head surface 42 drives staples 32a in substantially the identical manner discussed for the preferred embodiment shown in FIG. 5. Preferable angle Aa is about 45° but may be provided in the range of from about 30° to about 60° with respect to the back face surface 16a of panels 11a. Following the driving of staples 32a along preferably two sides of intermediate truss members 25a, a foamed adhesive material 46 is applied. As best seen in FIG. 10, pneumatic applicator 47 emits foamed adhesive 46 through a nozzle 48 of an adjustable rate. Foamed adhesive 46 preferably covers staples 32a and contacts the side of bottom chord 27a and back face surface 16a of panel 11a. Application of foamed adhesive 46 along only one side of non-joint intermediate truss members 25a is also envisioned within the scope of the invention. Similar to the preferred embodiment described with regard to FIGS. 4–8, outer truss members 20a (not shown) may receive foamed adhesive 46 on the inner side of bottom chords 22a if additional securement is required. The desirable material for foamed adhesive 46 is polyurethane foam. Additional suitable foamed adhesive may be used such as polystyrene foam and epoxy foam. The bead of adhesive applied at either side of bottom chord 27a has a generally triangular cross-section having a height of about one inch to about one and one-half inch and a base of from about one inch to about one and one-half inch.

Now returning to the preferred method steps of FIGS. 4–8, after the back fastening step, arms 45 of clamps 44 are untightened and the roof frame 18 and panel arrangement 15 relax from the cambered position as best illustrated by phantom lines in FIG. 8. The untightening of clamping means 44 can follow immediately after driving staples 32 and may precede the front fastening step. No setting time or drying time causes delay with adhesive material 31 because staples 32 provide sufficient back fastening that roof frame 18 is thereby rigidly secured to panel arrangement 15. Therefore following the front fastening step and unclamping of clamping means 44 the ceiling unit 10 is ready to be transported to support wall means in a mobile home for installation. The invention provides a ready-to-install ceiling unit 10 by this method of manufacture. Because no idle period for drying is required, making ceiling unit 10 does not slow down assembly line procedures and instead provides a unit ready to be installed immediately.

With the alternative preferred embodiment illustrated in FIGS. 9 and 10 utilizing foamed adhesive 46, the unit can likewise be immediately transported to installation position following the back fastening and front face fastening. No drying time is required because the front face fastening and back fastening rigidly secure the roof frame 18a (not fully shown) allowing immediate movement of the unit.

The needs of the mobile home industry also include providing a vapor barrier. This may be accomplished by placing a vapor barrier material on the back face surfaces 16 of panel arrangement 15 prior to transporting the ceiling unit 10 from tunnel jig 43. Conventionally, vapor barrier materials are either mopped on or sprayed on using conventional techniques. In the preferred embodiment a carboxylated styrene butadiene vapor barrier material is sprayed on. Preferably the vapor barrier material is continuous filming and provides a moisture resistant barrier. The vapor barrier material may also be mopped on and such may be accomplished by the use of polyvinylidene chloride or mopping on carboxylated styrene butadiene. In the preferred embodiment the carboxylated styrene butadiene provides a moisture barrier of one (1) Perm or less pursuant to ASTM Test No. C355-64, "Water Vapor Transmission of Thick Materials". A Perm is a vapor transmission rate of one grain of water vapor per square foot per hour, per inch of mercury vapor pressure difference. Materials, such as carboxylated styrene butadiene, having a transmission rate of one Perm or less are considered good vapor barriers.

In accordance with this invention any widely known vapor barrier material can be utilized with this invention to provide the necessary moisture resistance as required by the industry. It is desirable that the material be continuous filming so as to completely coat back face surface 16 of panel arrangement 15. Other suitable vapor barrier techniques may be employed within the ambit of this invention such as using pre-laminated panels or laying-in batts of vapor barrier material between truss members.

Thus it is apparent that there has been provided, in accordance with the invention, a mobile home ceiling unit that fully satisfies the object, aims, and advantages set forth above. It is also clear that the method of manufacturing the mobile home ceiling unit provides considerable time and cost savings while utilizing relatively facile construction manipulation. The invention has been described in conjunction with specific preferred alternate embodiments, namely providing an adhesive material in one manner between bottom chords and back faces of panels, and in another manner, along side bottom chords at the back faces of the panels. It is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of manufacturing a unitized ready-to-install mobile home ceiling structure comprising the steps of:
    (A) placing a plurality of generally rectangular panels on a tunnel jig with the longer sides of the panels generally perpendicular to the longitudinal axis of the tunnel jig abutting longer sides of said panels at joints in edge-to-edge adjacent relationship forming an overall generally rectangular panel arrangement having front and back face surfaces;
    (B) positioning a roof frame on the panel arrangement contacting the back face surfaces along bottom chords of truss members and along side edge rails whereby the side edge rails and outer truss members reside along the perimeter of the generally rectangular panel arrangement at the back face surface thereof;
    (C) back fastening bottom chords of truss members intermediate the outer truss members to the back face of the panels by means of driving fasteners along the bottom chords at the back face surface of the panels and by means of depositing adhesive material between the bottom chords and the back face surface of the panels;
    (D) front fastening the panels along substantially the full perimeter of the rectangular panel arrangement by means of driving fasteners upwardly at the front face surface of the panels along said perimeter thereof wherein said fasteners extending through the panels and penetrating the side edge rails and penetrating bottom chords of the outer truss members;
    (E) transporting the roof frame and panel arrangement from the tunnel jig as a unit providing a ready-to-install unitized mobile home ceiling structure wherein the set-up time of the adhesive material does not restrict moving the unit.

2. The method according to claim 1 wherein the back fastening step comprises driving staples with a pneumatic staple gun at spaced intervals of up to about twelve inches along said bottom chords at an angle of from about 30° to about 60° with respect to the back face surface of the panels wherein the staples penetrate the bottom chords and back face surface of the panels but stop short of piercing the front face surface.

3. The method according to claim 1 wherein the front face fastening step comprises driving staples with a pneumatic staple gun at spaced intervals of from about four inches to six inches.

4. The method according to claim 1 wherein the step of positioning the roof frame includes locating an intermediate truss member along each panel joint.

5. The method according to claim 1 including the step of coating the back face surface of the panels with a moisture resistant vapor barrier material.

6. The method according to claim 5 wherein the coating step comprises mopping on a moisture resistant vapor barrier material comprising polyvinylidene chloride.

7. The method according to claim 5 wherein the coating step comprises spraying a continuous film moisture resistant material comprising carboxylated styrene butadiene.

8. A method of manufacturing a unitized ready-to-install mobile home ceiling structure comprising the steps of:
- (A) placing a plurality of generally rectangular panels on a tunnel jig cambered along its longitudinal axis with the longer sides of the panel generally perpendicular to the longitudinal axis of the tunnel jig abutting longer sides of said panels at joints in edge-to-edge adjacent relationship forming an overall generally rectangular cambered panel arrangement having front and back face surfaces;
- (B) back fastening a roof frame to said panel arrangement by means of:
  - (i) applying at least one bead of adhesive material across the back face surface of the panels in correspondence with roof frame truss member spacing intervals;
  - (ii) positioning the roof frame on the cambered panel arrangement contacting the back face surface along bottom chords of the truss members and along side edge rails whereby the side edge rails and opposite outer truss members reside along the perimeter of the panel arrangement at the back face surface thereof;
  - (iii) tightening clamping means at opposite terminal end portions of the truss members thereby arching the bottom chords creating close contact across the span of the truss member with the cambered back face surfaces of the panels and compressing said adhesive material therebetween;
  - (iv) driving staples at spaced intervals along the bottom chords of truss members intermediate said outer truss members, wherein said staples are driven at an angle of from about 30° to about 60° to the back face surfaces of the panels, the staples penetrating the bottom chords and back face surface of the panels but stopping short of piercing the front face surface;
- (C) front fastening the panels along substantially the full perimeter of the rectangular panel arrangement by means of driving fasteners upwardly at the front face surface of the panels along said perimeter thereof, said fasteners extending through the panels and penetrating the side edge rails and penetrating bottom chords of the outer truss members;
- (D) untightening the clamping means; and,
- (E) transporting the roof frame and panel arrangement from the cambered tunnel jig as a unit providing a ready-to-install unitized mobile home ceiling structure wherein the set-up time of the adhesive material does not restrict moving the unit.

9. The method according to claim 8 wherein the step of driving staples at spaced intervals along bottom chords includes driving said staples with a pneumatic staple gun at an interval spacing of up to about twelve inches.

10. The method according to claim 8 wherein the front fastening step includes driving staples.

11. The method according to claim 10 including driving said staples with a pneumatic staple gun at spaced intervals of from about four inches to about six inches.

12. The method according to claim 8 wherein the step of positioning the roof frame, includes positioning an intermediate truss member along each panel joint.

13. The method according to claim 12 wherein the step of tightening the clamping means includes tightening, clamping means at terminal end portions of each intermediate truss member positioned at said panel joints and at opposite outer truss members.

14. The method according to claim 8 wherein the back fastening steps of applying adhesive and positioning the roof frame includes the steps of:
setting the roof frame initially on the back face surface of the panel arrangement with truss members located substantially at a longitudinal offset of from about one inch to about from three inches from their final position;
applying the adhesive material across the back face surface of the panels in correspondence with the roof frame truss member spacing intervals by means of a pneumatic applicator means having guide means thereon utilizing the bottom chords of the offset adjacent truss members as guiding means for application of the adhesive; and,
translating the roof frame to final position by means of moving the roof frame the offset distance placing the roof frame on the cambered panel arrangement contacting the back face surfaces along the bottom chords of the truss members and along side edge rails whereby the side edge rails and opposite outer truss members reside along the perimeters of the panel arrangement at the back face surface thereof.

15. The method according to claim 8 wherein the step of applying adhesive material comprises applying a bridging non-embrittling elastomeric material having minimum creep tendencies and having a set-up time of from about one hour to about twenty-four hours.

16. The method according to claim 8 including the additional step of coating the back face surface of the panels with a moisture resistant vapor barrier material.

17. The method according to claim 16 wherein the coating step comprises mopping on a polyvinylidene chloride.

18. The method according to claim 16 wherein the coating step comprises spraying carboxylated styrene butadiene.

19. The method according to claim 8 including the additional step of placing the unitized mobile home ceiling structure on four support wall means in a mobile home structure positioning the front fastened perimeter of the front face surface of the panel arrangement atop support means of support wall means thereby concealing the front face fasteners and providing a concealed back fastened mobile home ceiling.

20. A method of manufacturing a unitized ready-to-install mobile home ceiling structure comprising the steps of:
- (A) placing a plurality of generally rectangular panels on a tunnel jig with the longer sides of the panels generally perpendicular to the longitudinal axis of the tunnel jig abutting longer sides of said panels at joints in edge-to-edge adjacent relationship forming an overall generally rectangular panel arrangement having front and back face surfaces;
- (B) positioning a roof frame on the panel arrangement contacting the back face surfaces along bottom chords of truss members and along said side edge rails whereby the side edge rails and outer truss members reside along the perimeter of the generally rectangular panel arrangement at the back face surface thereof;

(C) back fastening the roof frame by means of:
  (i) driving staples at spaced intervals along the bottom chords of truss members intermediate said outer truss members, wherein said staples are driven at an angle of from about 30° to about 60° to the back face surface, the staples penetrating the bottom chords and back face surface of the panels but stopping short of piercing the front face surface;
  (ii) applying a foam adhesive along at least one side of the bottom chords of the intermediate truss members at the back face surface of the panels;

(D) front fastening the panels along substantially the full perimeter of the rectangular panel arrangement by means of driving fasteners upwardly at the front face surface of the panels along said perimeter thereof, said fasteners extending through the panels and penetrating the side edge rails and penetrating the bottom chords of the outer truss members; and, (E) transporting the roof frame and panel arrangement from the tunnel jig as a unit providing a ready-to-install unitized mobile home ceiling structure wherein the set-up time of the adhesive does not restrict moving the unit.

21. The method according to claim 20 wherein the back fastening step comprises driving the staples by means of a pneumatic staple gun at spaced intervals of up to about twelve inches.

22. The method according to claim 20 wherein the front fastening step comprises driving staples.

23. The method according to claim 22 wherein the front fastening step comprises driving said staples by means of a pneumatic staple gun at spaced apart intervals of from about four inches to about six inches.

24. The method according to claim 20 wherein the step of applying a foam adhesive material comprises applying a material selected from the group consisting of: polyurethane foam; epoxy foam; and, polystyrene foam.

25. The method according to claim 20 including the additional step of coating the back face surface of the panels with a moisture resistant vapor barrier material.

26. The method according to claim 25 wherein the coating step comprises mopping on polyvinylidene chloride.

27. The method according to claim 25 wherein the coating step comprises spraying carboxylated styrene butadiene.

28. The method according to claim 20 including the additional step of placing the mobile home ceiling unit on support wall means of a mobile home structure positioning the front fastened perimeter of the front face surfaces of the panel arrangement atop support means of said support wall means thereby concealing the front face fasteners and providing a concealed back fastened mobile home ceiling.

* * * * *

UNITED STATES PATENT AND TRADEMARK OFFICE
CERTIFICATE OF CORRECTION

PATENT NO. : 4,289,554
DATED : September 15, 1981
INVENTOR(S) : James E. Reicherts
William C. Veschuroff It is certified that error appears in the above—identified patent and that said Letters Patent is hereby corrected as shown below:

In the Specification:

Column 4, line 62, change "10" to --19--.

Colunm 4, line 39, insert after thirty-two the word --feet--.

Column 6, line 65, change "2C" to --20--.

Signed and Sealed this

Second Day of February 1982

[SEAL]

Attest:

Attesting Officer

GERALD J. MOSSINGHOFF

Commissioner of Patents and Trademarks